Figure 1:
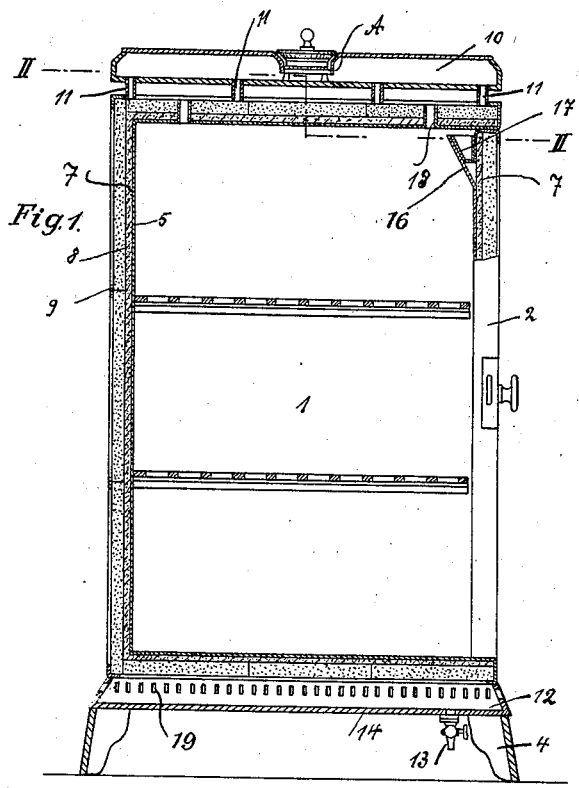

Nov. 6, 1923.

L. KIRSCHMANN

EVAPORATIVE REFRIGERATOR

Filed Feb. 6, 1923

1,473,593

Inventor.
Leopold Kirschmann

Patented Nov. 6, 1923.

1,473,593

UNITED STATES PATENT OFFICE.

LEOPOLD KIRSCHMANN, OF BERLIN-HALENSEE, GERMANY.

EVAPORATIVE REFRIGERATOR.

Application filed February 6, 1923. Serial No. 617,419.

*To all whom it may concern:*

Be it known that I, LEOPOLD KIRSCHMANN, a citizen of the German Republic, residing at Berlin-Halensee, Germany, have invented certain new and useful Improvements in Evaporative Refrigerators (for which I have made application for patent on May 8, 1922, and application for Utility model patent on May 22, 1922, in Germany), of which the following is a specification.

This invention relates to an arrangement for cold production designed to be used in connection with cooling plants of any type, for instance cooling cupboards, cooling chambers, railway cars and the like in which the cooling is produced by the evaporation of water. According to the invention the chamber or space to be cooled is enclosed by a layer of water-accumulating substance which is prepared so that it neither is submitted to decay nor to any other prejudicial phenomena.

The space to be cooled, the walls of which are preferably made of a metal which is a good conductor of heat, is surrounded by a very thin layer of water-accumulating or sponge-like fibrous material. The outer wall is formed of a cooling compress consisting of hygroscopic material and arranged so that its inner surface is in intimate contact with the layer of fibrous material, its outer surface being exposed to the outer air. This cooling compress consists of a material of light weight, for instance magnesia and refractory clay, which owing to a determined granular mixing is very porous and consequently makes a good evaporator. These compresses are composed of a number of elements of small size connected by metal frames in which the elements are connected so that the water can escape from the compress only through the porous elements.

According to the invention the layer of water-accumulating fibrous material communicates with the water tank by means of connecting pipes which traverse the plates of magnesia or fire clay covering the top part of the hollow space and which thus establish a permanent connection with the intermediate layers. The whole space to be cooled is thus continuously and uniformly surrounded from top to bottom by water and the evaporation of the water takes place quite uniformly at the upper and at the lower end side plate, back plate and door, the cold produced by this evaporation of the water being utilized in the best manner.

Compresses or cooling apparatus of clay for evaporation of water have become known already but they present the inconvenience that their material is of very great weight, so that hollow spaces of large size could not be cooled in this manner as the compresses must rest upon the ground owing to the great weight and consequently no evaporation could take place towards the ground. In apparatus of known type the inner wall is also made of clay and the interval between the inner wall and outer wall is filled with water which evidently collects in the lower part so that there is soon no water at the upper part, the water being forced out through the pores of the lower part. In the semi-dry upper part of the apparatus of clay moulding growth is produced wherefrom resulted a rapid decay of the clay vessel.

All these inconveniences are avoided by this invention. The elements made from magnesia and fire clay and securely mounted in metal frames form together a cooling compress. Owing to the light weight the elements are not heavy so that the apparatus can be mounted on feet, its bottom plate being at a convenient distance from the ground so that the bottom plate is also cooled by evaporation and the inner space is intensively cooled.

A cooling cupboard constructed according to the invention is shown by way of example on the accompanying drawing in Fig. 1 in a vertical section.

Figure 2:
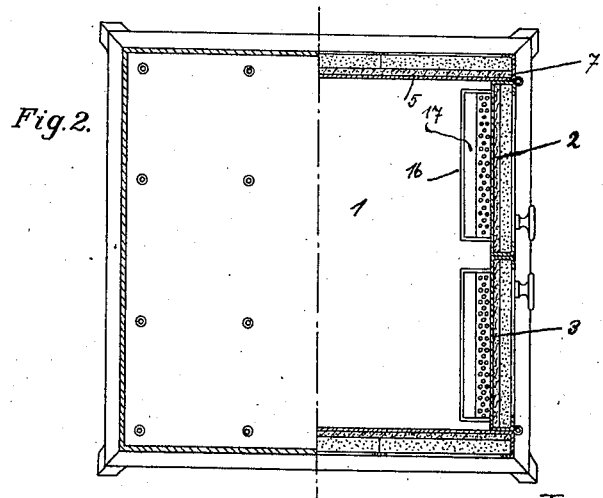

Fig. 2 is a cross section on line II—II of Fig. 1.

The cooling cupboard consists of a chest 1 with doors 2 and 3, mounted upon a water collector 12 which has air holes 19 and feet 4. Said air holes 19 serve to permit the access of the air to the lower surface of the bottom plate of the refrigerator. The inner walls 5 of the chest and of the doors are of sheet zinc so that, the door being closed, a cooling chamber is formed which is closed all round and has only in the top plate outlets or vents 18 for the gases.

The inner walls 5 are covered with a layer 7 of water-holding fibrous or other conveniently prepared material. Upon this layer 7 a compress of magnesia, fire clay or other porous material is arranged. The compress which forms the outer wall of the cooling cupboard is composed of tiles 8 mounted in frames 9 of sheet zinc, the joints being cemented. The outer surface of the compress is exposed to the outer air and the inner surface is in contact with the water-holding layer 7.

At some distance above the top plate of the cooling cupboard a cup shaped water reservoir 10 is arranged which is connected with the water-holding layer 7 by means of tubes 11 in such a manner that the water from the reservoir 10 is rapidly distributed through the tubes over the entire surface of the water-holding layer 7. The water is filled into the reservoir 10 through a funnel-shaped inlet A, filled with filtering material. The water flows from reservoir 10 through the narrow tubes 11 onto the layer 7 which accumulates the water so that it comes in contact with the inner surfaces of the tiles 8 of the compress. These tiles 8 absorb the water which is evaporated by contact with the outer air. If too much water is absorbed by the tiles 8 so that it flows out of the pores of said tiles it collects in the collector 12. A discharge cock 13 is arranged in the bottom plate 14 of the collector 12.

The doors 2, 3 are covered each on the outer surface with a layer of water-holding fibrous material and with plates or tiles of porous material. As can be seen on the drawing the upper part 16 of the inner wall of sheet zinc of each door is bent off inwardly to project into the cooling chamber, a water reservoir 17 being arranged in the hollow space which is thus formed so that water can be poured into the layer 7 of each door.

By the evaporation of the moistness which filters through the tiles 8 the inner wall 1 of sheet zinc of the chest and of the doors is continuously cooled and as the materials of which the layer 7 and the outer wall consist have at the same time an insulating effect the temperature in the cooling cupboard is easily reduced to approximately 10° C. without the use of ice or refrigerating mixture.

I claim:—

1. An evaporative refrigerator in which the walls are covered on the outside by a layer of waterholding fibrous material and by an outer envelope of tiles made from magnesia.

2. An evaporative refrigerator in which the walls are covered on the outside by a layer of water-holding fibrous material and by an outer envelop of tiles made from convenient hygroscopic earths.

3. An evaporative refrigerator in which the walls are covered on the outside by a layer of water-holding fibrous material and by an outer envelop of tiles made from magnesia, and means for supplying water to said layer of water-holding material so that it accumulates the water uniformly whereby a uniform moistening of the whole surface of the outer envelope in contact with said layer is ensured.

4. An evaporative refrigerator in which the walls are covered on the outside by a layer of water-holding fibrous material and by an outer envelope of tiles made from magnesia, and means for supplying water to said layer of water-holding material so that it accumulates the water uniformly whereby a uniform moistening of the whole surface of the outer envelope in contact with said layer is ensured, and a bottom plate of said refrigerator arranged so that it is exposed to the air for ensuring the evaporation and cooling of the inner space of the refrigerator at all parts.

5. An evaporative refrigerator in which the walls are covered on the outside by a layer of water-holding fibrous material and by an outer envelope of tiles made from magnesia, means for supplying water to said layer of water-holding material so that it accumulates the water uniformly whereby a uniform moistening of the whole surface of the outer envelope in contact with said layer is ensured, and a bottom plate of said refrigerator arranged so that it is exposed to the air for ensuring the evaporation and cooling of the inner space of the refrigerator at all parts, a water tank above said means for supplying water to the layer of water holding material, and a filter device in said water tank designed to retain the impurities and mud in the water.

6. An evaporative refrigerator, comprising in combination a chest of sheet zinc, doors of said chest made of sheet zinc so that they tightly fit in the chest, a layer of material capable to hold water covering said chest and the doors of sheet zinc, an outer envelope composed of tiles of porous material, sheet zinc frames in which said tiles are cemented, a water reservoir above the top plate of the chest, tubes connecting said water reservoir with the intermediate layer covering the sheet zinc wall of the chest, and a water reservoir at the top of the sheet zinc wall of each door, so that the intermediate layers of the chest and of the doors are supplied with water which evaporates through the porous outer wall.

7. An evaporative refrigerator, comprising in combination a chest of sheet zinc, doors of said chest made of sheet zinc so that they tightly fit in the chest, a layer of material capable to hold water covering said chest and doors of sheet zinc, an outer envelope composed of tiles of porous material, sheet zinc frames in which said tiles of porous material are cemented, a water reservoir above the top plate of the sheet, tubes connecting said water reservoir with the intermediate layer covering the sheet zinc wall of the chest, a water reservoir at the top of the sheet zinc wall of each door, and a water collector with air holes under the bottom plate of the chest so that the water supplied to the intermediate layers does not only evaporate at the top plate, the side walls and the doors of the chest but also at the bottom plate of the same.

8. An evaporative refrigerator, comprising in combination a chest of sheet zinc, doors of said chest made of sheet zinc so that they tightly fit in the chest, a layer of material capable to hold the water covering said chest and doors of sheet zinc, an outer envelope composed of tiles of porous material, sheet zinc frames in which said tiles of porous material are cemented, a water reservoir above the top plate of the chest, a water inlet for the reservoir having perforated walls and filtering means to retain the impurities contained in the water, tubes connecting said water reservoir with the intermediate layer covering the sheet zinc wall of the chest, a water reservoir at the top of the sheet zinc wall of each door, and a water collector with air holes under the bottom plate of the chest so that the water supplied to the intermediate layer does not only evaporate at the top plate, the side walls and the doors of the chest but also at the bottom plate of the same.

In testimony whereof I affix my signature in presence of two witnesses.

LEOPOLD KIRSCHMANN.

Witnesses:
  OTTO PONTOW,
  SORPER B. TUMY.